(12) United States Patent
Christakopoulou et al.

(10) Patent No.: US 11,962,854 B2
(45) Date of Patent: Apr. 16, 2024

(54) PROVIDING CONTENT RECOMMENDATIONS FOR USER GROUPS

(71) Applicant: Apple Inc., Cupertino, CA (US)

(72) Inventors: Evangelia Christakopoulou, Los Gatos, CA (US); Chandrasekar Venkataraman, Palo Alto, CA (US); Jayasimha R. Katukuri, San Jose, CA (US); Aravind Ragipindi, Milpitas, CA (US); Moloud Shahbazi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/493,796

(22) Filed: Oct. 4, 2021

(65) Prior Publication Data

US 2022/0394336 A1    Dec. 8, 2022

Related U.S. Application Data

(60) Provisional application No. 63/197,492, filed on Jun. 6, 2021.

(51) Int. Cl.
*H04N 21/466* (2011.01)
*H04N 21/442* (2011.01)
*H04N 21/45* (2011.01)

(52) U.S. Cl.
CPC ... *H04N 21/4661* (2013.01); *H04N 21/44222* (2013.01); *H04N 21/4532* (2013.01)

(58) Field of Classification Search
CPC ......... H04N 21/4661; H04N 21/44222; H04N 21/4532
See application file for complete search history.

(56) References Cited

U.S. PATENT DOCUMENTS 10,068,257 B1    9/2018  Mosthaf
10,554,611 B2 *  2/2020  Lewis ................... H04L 65/612
(Continued)

FOREIGN PATENT DOCUMENTS

EP         2827277          1/2015

OTHER PUBLICATIONS

Cantador et al., "Group Recommender Systems: New Perspectives in the Social Web," Computational Intelligence, Jan. 2012, 19 pages.

(Continued)

*Primary Examiner* — Nathan J Flynn
*Assistant Examiner* — Christine A Kurien
(74) *Attorney, Agent, or Firm* — BAKERHOSTETLER

(57) ABSTRACT

A device implementing the subject system may include at least one processor configured to obtain a first preference profile corresponding to a first user, a second preference profile corresponding to a second user, and a group preference profile corresponding to a user group that includes the first and second users. The at least one processor may be further configured to generate an aggregate preference profile based at least in part on the first preference profile, the second preference profile, and the group preference profile and to identify content items based at least in part on the aggregate preference profile. The at least one processor may be further configured to rank the content items and provide, for display on a content output device, at least one indication of at least one of the ranked content items as a recommendation for the user group.

19 Claims, 8 Drawing Sheets

(56) References Cited

U.S. PATENT DOCUMENTS

| | | | |
|---|---|---|---|
| 2009/0328105 A1* | 12/2009 | Craner | H04N 21/44224 |
| | | | 725/46 |
| 2011/0069940 A1* | 3/2011 | Shimy | H04N 21/42201 |
| | | | 386/296 |
| 2011/0145040 A1 | 6/2011 | Zahn et al. | |
| 2013/0305290 A1* | 11/2013 | Craner | H04N 21/4668 |
| | | | 725/46 |
| 2020/0401908 A1 | 12/2020 | Ortega et al. | |
| 2021/0019325 A1* | 1/2021 | Edge | G06F 16/953 |

OTHER PUBLICATIONS

Garcia et al., "A Group Recommender System for Tourist Activities," 18th International Conference on Electronic Commerce and Web Technologies, Sep. 2009, pp. 26-37.

International Search Report and Written Opinion from PCT/US2022/031224, dated Aug. 25, 2022, 10 pages.

* cited by examiner

PROVIDING CONTENT RECOMMENDATIONS FOR USER GROUPS

CROSS REFERENCE TO RELATED APPLICATIONS

This application claims the benefit of priority to U.S. Provisional Patent Application No. 63/197,492, entitled "Providing Content Recommendations for User Groups," filed on Jun. 6, 2021, the disclosure of which is hereby incorporated herein in its entirety.

TECHNICAL FIELD

The present description relates generally to providing content recommendations, including providing content recommendations for user groups.

BACKGROUND

Users may watch content, such as movies, television shows, etc., individually and/or in a group, such as with other users.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
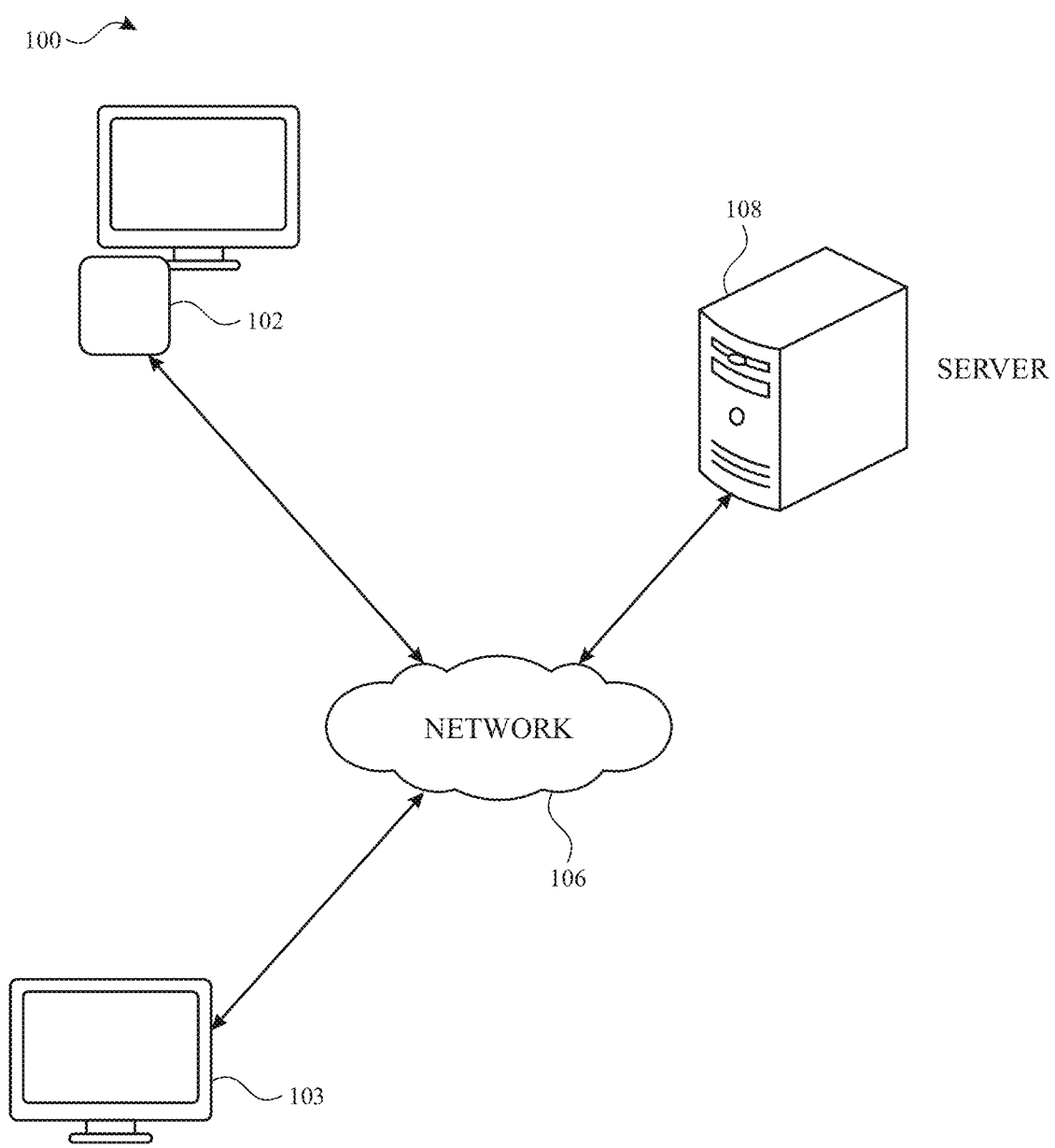
FIG. 1 illustrates an example network environment for providing content recommendations for user groups in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users may use content output devices, such as set-top boxes, smart televisions, and the like, to view content, such as movies, television shows, etc. In some instances, a user may view content individually (e.g., alone) and the content output device may generate a preference profile for the user based on, for example, the user's content viewing activity. Based on the user's preference profile, the content output device may provide one or more content recommendations to the user.

In other instances, the user may view content in a user group, such as with one or more other users. However, the content viewing activity of the user group may differ from the content viewing activity when the user is viewing content alone. Thus, content recommendations provided based on the user's individual content viewing history may not be relevant and/or useful to the user group. Furthermore, the user group content viewing history may distort and/or dilute the viewing history of the user alone, and therefore may distort the content recommendations provided to the user alone.

For example, if a user typically watches sci-fi movies when they viewing are alone, but the user and their significant other watch romance movies when viewing together (e.g., in a user group), the content recommendations generated based on the user's viewing history (e.g., sci-fi movies) may not be useful to the user group that includes the user and their significant other. Similarly, if the romance movie viewing history of the user group is attributed to the user's viewing history, the content recommendations provided to the user when watching alone may deviate from the sci-fi movies that the user typically watches when viewing alone.

In the subject system, when multiple users are viewing content together on a content output device, the users can select (e.g., using a remote controller, a keyboard, a touchscreen, a voice request, or other input device, component, or process) the user profile of each user viewing together to generate a user group that includes each of the viewing users. The content output device may then generate a user group preference profile based on the viewing history of the user group and/or based on the viewing histories of the individual users. The user group preference profile and/or the preference profile of each of the users in the user group may be used to generate content recommendations for the user group. Furthermore, the subject system can be configured, in one or more implementations, such that the viewing history of the user group is not attributed to any of the individual users in the user group, and therefore the viewing history of the users when viewing alone is not impacted by the viewing history of the user group. In various examples described herein, a user group that includes two users (e.g., a first user and a second user) is described. However, this is merely to simplify aspects of the discussion herein, and it is appreciated that user groups having more than two users (e.g., three users, four users, five users, or any number of users) can be generated and provided with group content recommendations using the technology described herein.

FIG. 1 illustrates an example network environment 100 for providing content recommendations for user groups in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 103, a network 106 and a server 108. The network 106 may communicatively (directly or indirectly) couple, for example, any two or more of the electronic devices 102-103 and/or the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-103 and a single server 108; however, the network environment 100 may include any number of electronic devices and any number of servers.

The server 108 may be, and/or may include all or part of the electronic system discussed below with respect to FIG. 8. The server 108 may include one or more server devices and/or server instances, such as a cloud of servers, that may be used to facilitate providing group recommendations. For explanatory purposes, a single server 108 is shown and discussed with respect to various operations. However, these and other operations discussed herein may be performed by one or more servers, and each different operation may be performed by the same or different servers.

One or more of the electronic devices 102-103 may be, for example, a content output and/or viewing device such as a laptop computer, a smartphone, a smart television, a set-top box (which may refer to any device that may be communicatively coupled to a display, such as a television), a tablet device, or any other appropriate device that includes, for example, a component for outputting content. In FIG. 1, by way of example, the electronic device 102 is depicted as a set-top box, and the electronic device 103 is depicted as a smart television. Each of the electronic devices 102-103 may be, and/or may include all or part of, the device discussed below with respect to FIG. 2, and/or the electronic system discussed below with respect to FIG. 8.

In one or more implementations, one or more of the electronic devices 102-103 may be registered to, and/or associated with, one or more primary user accounts, such as a user account with (and/or managed by) the server 108 and/or an entity associated therewith. In one or more implementations, two or more of the electronic devices 102-104 may be registered to and/or associated with the same user account and/or different user accounts. Alternatively and/or in addition to being registered to one or more primary user accounts, one or more of the electronic devices 102-104 may also be associated and/or registered to one or more secondary user accounts and/or secondary user profiles.

For example, if the electronic device 102 is in a home of multiple users, a secondary user account of each additional user who lives in (and/or visits) the home may be associated with the electronic device 102. In this instance, the electronic device 102 may maintain a separate account and/or user preference profile for each of the registered and/or associated user accounts. When a particular user is accessing the electronic device 102, they may select their account and/or profile and then the viewing and/or other activity the user participates in on the electronic device 102 (e.g., content viewing, content impressions, content likes, content purchases, etc.) may attributed to their user account and/or profile, e.g., an indication of the same may be stored on the electronic device 102 in association with the user account identifier and/or profile identifier. From the activity history of the user on the electronic device 102, the electronic device 102 may generate one or more recommendations for the user, such as movie recommendations, television show recommendations, and the like.

Figure 3:
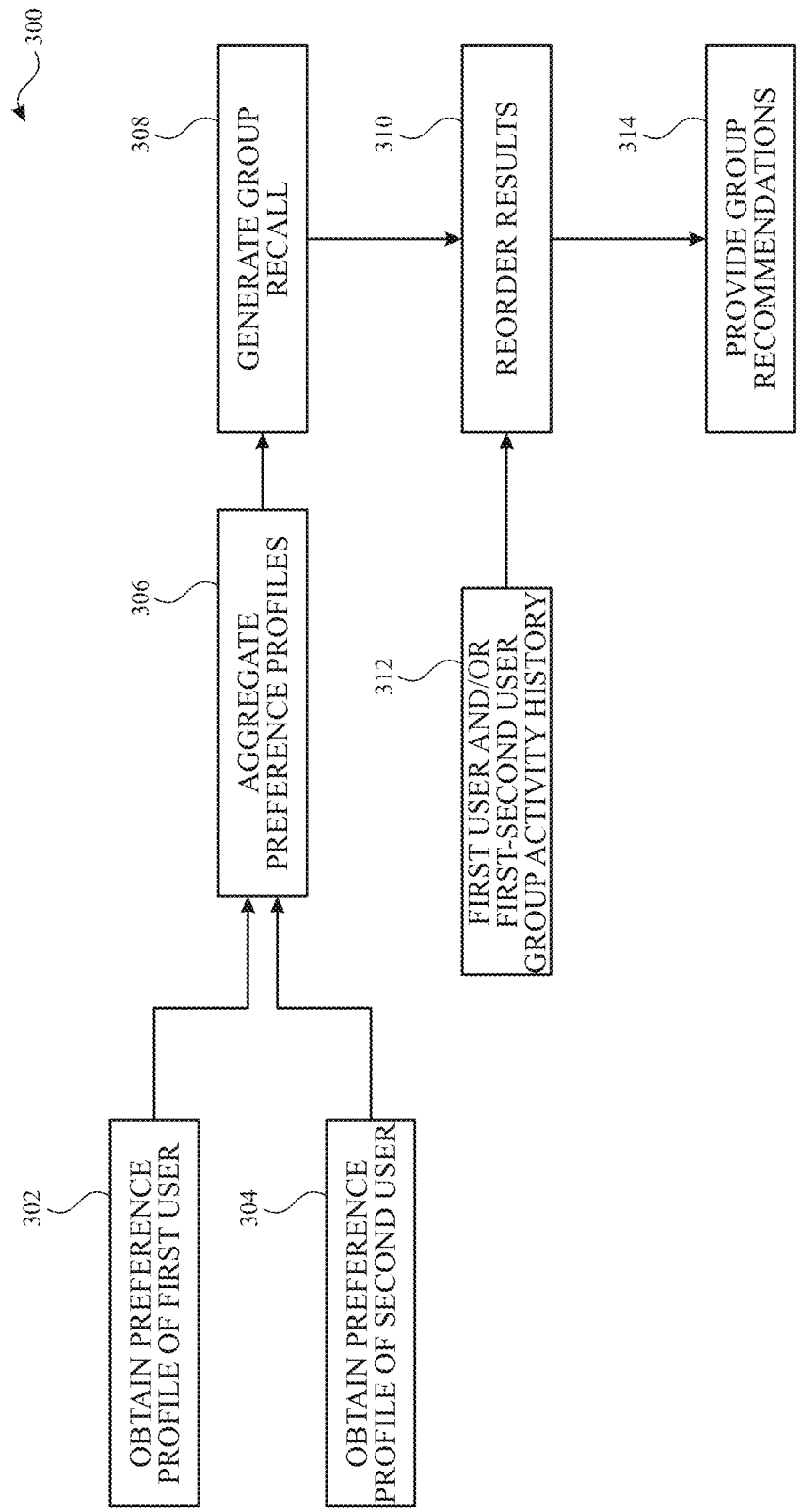
FIG. 3 illustrates an example process flow for providing content recommendations for user groups in accordance with one or more implementations.
Figure 4:
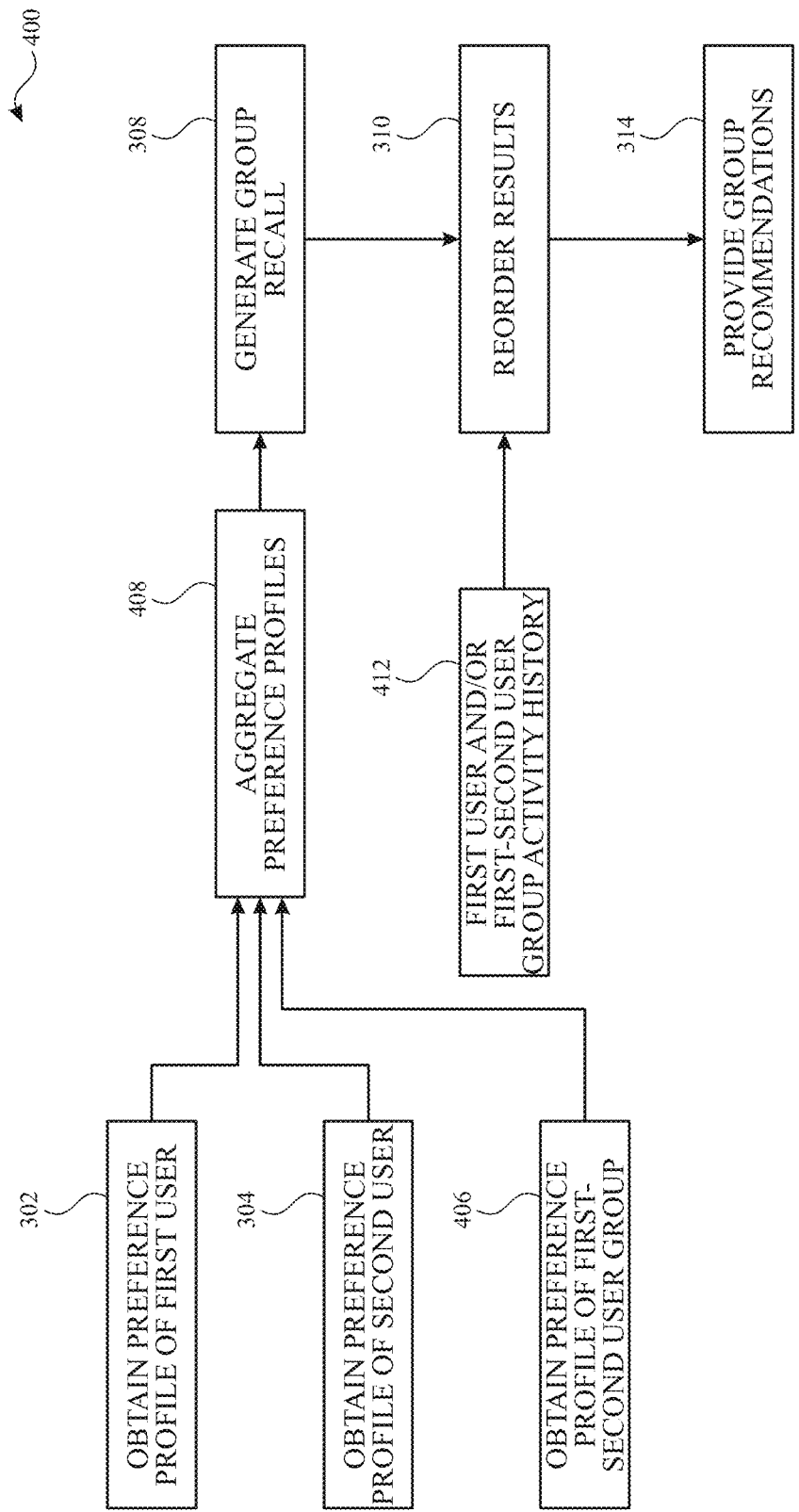
FIG. 4 illustrates an example process flow for providing content recommendations for user groups using a group preference profile in accordance with one or more implementations.
Figure 5:
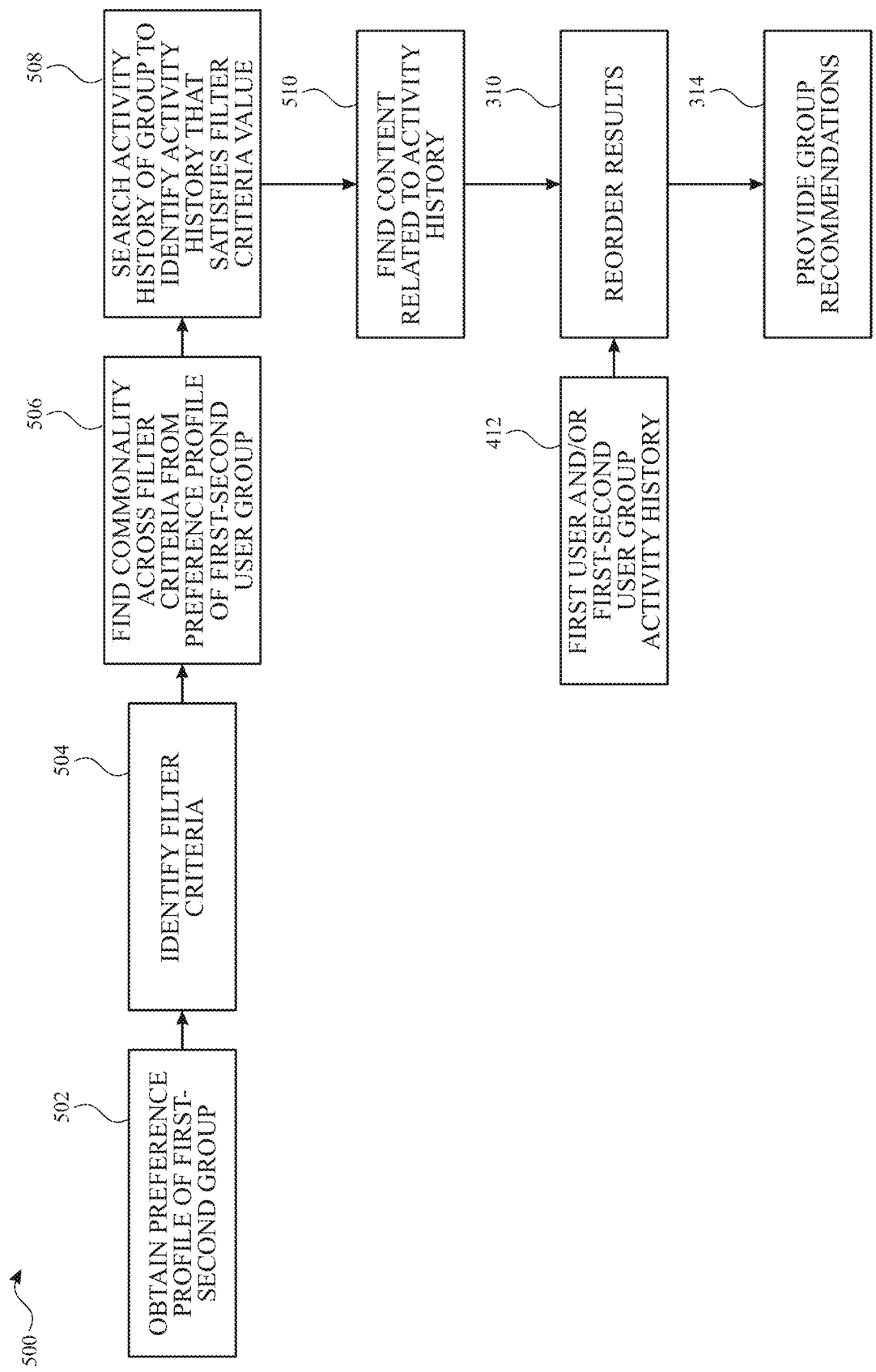
FIG. 5 illustrates an example process flow for providing content recommendations for user groups for a particular filter criteria in accordance with one or more implementations.

Furthermore, if multiple users are concurrently using the electronic device 102 (e.g., jointly viewing content output by the electronic device 102), each of the users may activate and/or select a representation of their user account and/or profile on the electronic device 102, such as by selecting an avatar and/or representation of their user account (e.g., via a touch-based interaction, a voice interaction, or another user interaction with the electronic device 102). In this instance, the electronic device 102 may generate and/or reproduce an identifier (e.g., a unique identifier) that identifies the user group corresponding to each selected and/or activated user account and/or profile. Using the identifier, the electronic device 102 may store data indicative of the activity history of the user group, and from the stored data the electronic device 102 may subsequently generate a user group preference profile and/or one or more content recommendations for the user group. Example process flows for providing content recommendations for user groups are discussed further below with respect to FIGS. 3-5. For explanatory purposes, the process flows in FIGS. 3-5 are discussed in the context of two different users in a user group; however, the process flows are equally applicable to any number of users (e.g., three users, four users, five users, six users, or another number of users) in a user group.

Figure 2:
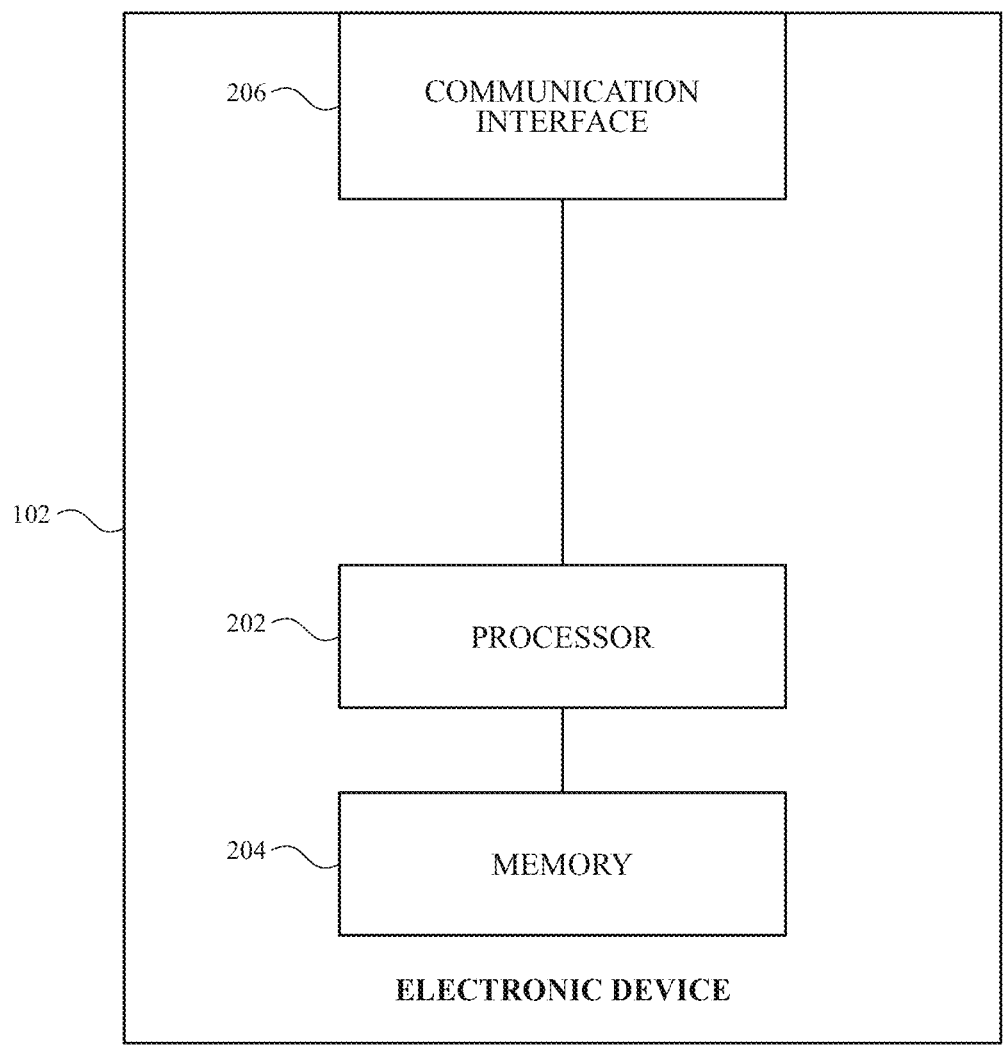
FIG. 2 illustrates an example electronic device that may implement a system for providing content recommendations for user groups in accordance with one or more implementations.

FIG. 2 illustrates an example electronic device 102 that may implement a system for providing content recommendations for user groups in accordance with one or more implementations. For example, the electronic device 102 of FIG. 2 can correspond to any of the electronic devices 102-103, and/or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and communication interfaces 206. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 206 may include suitable logic, circuitry, and/or code that enables wired or wireless communication, such as between any of the other electronic devices 103-104 and/or the server 108 over the network 106. The communication interface 206 may include, for example, one or more of a Bluetooth communication interface, a cellular communication interface (e.g., 3G, 4G, LTE, 5G, etc.), an NFC interface, a Zigbee communication interface, a WLAN communication interface (e.g., Wi-Fi, WLAN/BT combination, WiMAX, LiFi, 2.4 GHz, 5 GHz, etc.), a USB communication interface, an Ethernet communication interface, a millimeter wave (e.g., 60 GHz) communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

FIG. 3 illustrates an example process flow 300 for providing content recommendations for user groups in accordance with one or more implementations. For explanatory purposes, the process flow 300 is primarily described herein with reference to the electronic device 102 of FIG. 1. However, the process flow 300 is not limited to the electronic device 102 of FIG. 1, and one or more blocks (or operations) of the process flow 300 may be performed by one or more other components of the electronic device 102 and/or by other suitable devices (e.g., any of the electronic device 103 and/or server 108). Further for explanatory purposes, the blocks of the process flow 300 are described herein as occurring in serial, or linearly. However, multiple blocks of the process flow 300 may occur in parallel. In addition, the blocks of the process flow 300 need not be performed in the order shown and/or one or more blocks of the process flow 300 need not be performed and/or can be replaced by other operations.

In the process flow 300, the electronic device 102 may obtain a preference profile of a first user of the electronic device 102 (302), and a preference profile of a second user of the electronic device 102, such as from the memory 204 (304). For example, the electronic device 102 may generate and/or maintain preference profiles for each user of the electronic device 102 (e.g., each user that has a separate user account and/or profile with the electronic device 102).

In one or more implementations, the preference profiles may indicate the activity history of the users on the electronic device 102. For example, the preference profile of the first user may indicate the viewing and/or purchase history of the first user. In one or more implementations, the preference profiles of the users may be generated from the activity history of the user of the electronic device 102, such as viewing history, purchase history, impressions history, and the like. In one or more implementations, the preference profiles may be and/or may include a vector of key-value pairs. Each key-value pair may include correspond to a particular attribute value of particular attribute of the content items along with a value and/or weight that indicates the affinity of the user for the particular attribute value. For example, a first key-value pair may correspond to the comedy genre and the corresponding weight may be determined based on whether the user has watched any comedy movies and/or a number of comedy movies the user has watched over a particular period of time, e.g., last day, month, week, year, etc.

Thus, each attribute may correspond to any attribute, tag (e.g., editorial tag), and/or descriptor that a given content item may have, such as, for movies, genre, decade, actor, producer, director, setting, and the like. Similarly, each attribute value of each attribute may correspond to one or more attribute values that the attribute may have, such as, for genre, comedy, sci-fi, horror, romance, and the like. Accordingly, based on the activity history of the user, the preference profile of the user may be populated to reflect the different attribute values of the different content the user has viewed, purchased, and the like. Thus, a single content item may have multiple attribute values corresponding to a single attribute. For example, for the genre attribute a particular movie may have an attribute value of romance, and of comedy for which the corresponding key-value pair may be set to have a higher value, whereas for the attribute values that are not applicable to the movie (e.g., horror), the key-value pair values may be set low or to zero.

Thus, each content item itself may be associated with a vector of key-value pairs that describe the content item. In one or more implementations, each content item may be embedded in an embedding space and the vector for each content item may correspond to the content item embedding in the embedding space. Accordingly, distances between different content item embeddings in the embedding space (and/or nearest neighbors) may be determined using an appropriate distance function, such as a function based on cosine similarity and/or any other appropriate function. In one or more implementations, proximate content item embeddings in the embedding space may correspond to content items that are related to each other. Example vector key-pair values are discussed further below with respect to FIG. 6.

Once the electronic device 102 obtains the preference profiles of the first and second users, the electronic device 102 aggregates the preference profiles to generate an aggregate preference profile (306). For example, the electronic device 102 may take an intersection and/or overlap of the preference profiles and/or the electronic device 102 may take a union or superset of the preference profiles. In the instance of taking the intersection and/or overlap, when the preference profiles are represented by the vectors of key-value pairs, the electronic device 102 may take the minimum value for each key across the users, and for the union/superset, the electronic device 102 may take the maximum value for each key across the users.

The electronic device 102 may then generate the recall set based on the aggregate preference profile and/or the preference profiles of the first and/or second user (308). For example, the electronic device 102 may search for one or more content items that most closely coincide with the aggregate preference profile, and/or one or more content items related thereto. In one or more implementations, the electronic device 102 may identify one or more recent content items viewed by the first user (and/or one or more content items related thereto), and/or the electronic device 102 may identify one or more content items recently viewed by the second user (and/or one or more content items related thereto), and may generate the recall set based on content items that relate to the recently viewed content items.

For example, for each combination of each content item corresponding to the first user and each content item corresponding to the second user (e.g., candidate content items), the electronic device 102 may obtain an embedding for each content item, such as from the embedding space, and may average the embeddings to obtain an aggregate embedding. In the instance of embeddings represented by vectors, the electronic device 102 may average each corresponding value in the vectors to generate a vector that represents the aggregate embedding. The electronic device 102 may then take each aggregate embedding and apply it to the embedding space to identify one or more nearest neighbor embeddings in the embedding space. The electronic device 102 may identify the one or more content items that correspond to the one or more nearest neighbor embeddings and may select the content items for inclusion in the recall set.

In one or more implementations, the electronic device 102 may verify that the nearest neighbor embeddings are at least a first threshold distance away from one or more of the embeddings corresponding to the content items that the aggregate embedding was generated from (e.g., to ensure that the nearest neighbor embeddings are not too similar to either one of the original embeddings). Similarly, in one or more implementations, the electronic device 102 may verify that the nearest neighbor embeddings are no more than a second threshold distance away from one or more of the embeddings corresponding to the content items that the aggregate embedding was generated from (e.g., to ensure that the nearest neighbor embeddings are not too dissimilar to either one of the original embeddings).

The electronic device 102 may then reorder and/or rank (310) the results (e.g., the identified content items) based on, for example, the activity history (312) of the first user, the second user, and/or the first-second user group (e.g., on the electronic device 102 and/or on one or more other electronic devices associated with and/or registered to a user account of the first user or the second user). For example, the electronic device 102 may demote one or more content item results that the first user recently viewed (and therefore may not be interested in viewing again).

The electronic device 102 may then select one or more of the content items from the ranked results, such as the top ranked content items, and may provide (314) one or more viewing recommendations that correspond to the top ranked content items to the user group of the first and second user. For example, the electronic device 102 may display representations of the top ranked content items, and the first and/or second user may select one of the representations to initiate playback of the corresponding content item.

In one or more implementations, the electronic device 102 may also generate an identifier, such as a unique identifier, that represents the user group that includes the first and second user, and may store activity history of the user group in association with the identifier. For example, the electronic device 102 may utilize a client-known secret key that may, in one or more implementations, be different per user and per electronic device, and/or that may be synchronized across electronic devices associated with and/or registered to the same user account and/or within the same user group, e.g., the same family. The electronic device 102 may generate the user group identifier using a hash of, for example, the secret key and/or account identifiers of the users in the user group (e.g., a concatenation of the account identifiers).

FIG. 4 illustrates an example process flow 400 for providing content recommendations for user groups using a group preference profile in accordance with one or more implementations. For explanatory purposes, the process flow 400 is primarily described herein with reference to the electronic device 102 of FIG. 1. However, the process flow 400 is not limited to the electronic device 102 of FIG. 1, and one or more blocks (or operations) of the process flow 400 may be performed by one or more other components of the electronic device 102 and/or by other suitable devices (e.g., any of the electronic device 103 and/or server 108). Further for explanatory purposes, the blocks of the process flow 400 are described herein as occurring in serial, or linearly. However, multiple blocks of the process flow 400 may occur in parallel. In addition, the blocks of the process flow 400 need not be performed in the order shown and/or one or more blocks of the process flow 400 need not be performed and/or can be replaced by other operations.

In the process flow 400, the electronic device 102 may obtain the preference profile of the first user (302), may obtain the preference profile of the second user (304), and may obtain a preference profile of the first-second user group that includes the first and second users (406). For example, the electronic device 102 may generate the preference profile for the first-second user group in the same manner as described in FIG. 3 with respect to the first and second users, but using the activity history of the user group (e.g., retrieved from memory 204 by reproducing the user group identifier in the manner described above).

The electronic device 102 may aggregate the preference profiles, such as by taking an intersection and/or union of any different groupings of the preference profiles (408). For example, the electronic device 102 may take an intersection of the first and second user preference profiles (e.g., in the manner described above) to produce an intermediate aggregate profile, and the electronic device 102 may take the union of the intermediate aggregate profile and the first-second user group profile to obtain the aggregate preference profile.

The electronic device 102 may then generate the recall group based on the aggregate preference profile (308), such as in the manner described above, and the electronic device 102 may reorder the results (310), such as based on the activity history of the first user, the second user, and/or the first-second user group (412). The electronic device 102 may then provide the group recommendations in the manner described above (314)

FIG. 5 illustrates an example process flow 500 for providing content recommendations for user groups for a particular filter criteria in accordance with one or more implementations. For explanatory purposes, the process flow 500 is primarily described herein with reference to the electronic device 102 of FIG. 1. However, the process flow 500 is not limited to the electronic device 102 of FIG. 1, and one or more blocks (or operations) of the process flow 500 may be performed by one or more other components of the electronic device 102 and/or by other suitable devices (e.g., any of the electronic device 103 and/or server 108). Further for explanatory purposes, the blocks of the process flow 500 are described herein as occurring in serial, or linearly. However, multiple blocks of the process flow 500 may occur in parallel. In addition, the blocks of the process flow 500 need not be performed in the order shown and/or one or more blocks of the process flow 500 need not be performed and/or can be replaced by other operations.

The process flow 500 may be used, for example, to generate group recommendations that correspond to a particular filter criteria, such as genre, actor, tag (e.g., editorial tag), and the like. For example, the electronic device 102 may generate group recommendations corresponding to a particular genre, such as horror, which may be displayed together to the user, such as via a user interface element that represents a shelf.

In the process flow 500, the electronic device 102 may obtain the preference profile of the first-second user group, such as from the memory 204 (502). The electronic device 102 may then identify filter criteria (504). The filter criteria may correspond to a particular attribute that the electronic device 102 would like to filter group recommendations based on such as genre, actor, tag, and the like. For example, for explanatory purposes, the electronic device 102 may select the genre filter criteria.

Once the filter criteria has been selected or identified, the electronic device 102 may search through the first-second user group preference profile to identify the different attribute values of the attribute that are relevant to the user group, such as the attribute values for the attribute that have high values and/or weights, and may select one of the attribute values, such as using a random weighted approach (506). For example, for explanatory purposes, the electronic device 102 may select the horror genre.

The electronic device 102 may then search through the activity history of the user group and/or of the individual users, to identify the activity history that satisfies the filter criteria value (508), e.g., the activity history that corresponds to the horror genre, such as movies viewed by the users and/or the user group that are in the horror genre. From the activity history identified as satisfying the filter criteria value (and/or the content items corresponding thereto), the electronic device 102 may find related content items. For example, the electronic device 102 may search, e.g., in the embedding space, for content items that are related to the activity history (510).

The electronic device 102 may then rank and/or reorder the resulting content items (310) using the first user, second user, and/or first-second user group activity history (412), and may provide the corresponding group recommendations (314) in the manner described above. In one or more implementations, the group recommendations may be presented to the user via a user interface element that may also identify the filter criteria value used to search for the content items. For example, the user interface may display a shelf that presents the content items corresponding to the group recommendations and may include text that reflects the filter criteria value, e.g., "Horror movies you may like" or "Movies you may like because you've viewed horror movies," or the like.

Although FIG. 5 is discussed herein in the context of genres, it will be understood that FIG. 5 is equally applicable to, for example, actors (e.g., the top X listed actors and/or all actors), directors, tags, or generally any attribute of content items. Furthermore, the content item recommendations, activity histories and/or the preference profiles may be segmented between television shows and movies, e.g., such that movie recommendations are based on movie activity history and television recommendations are based on television viewing history.

Figure 6:
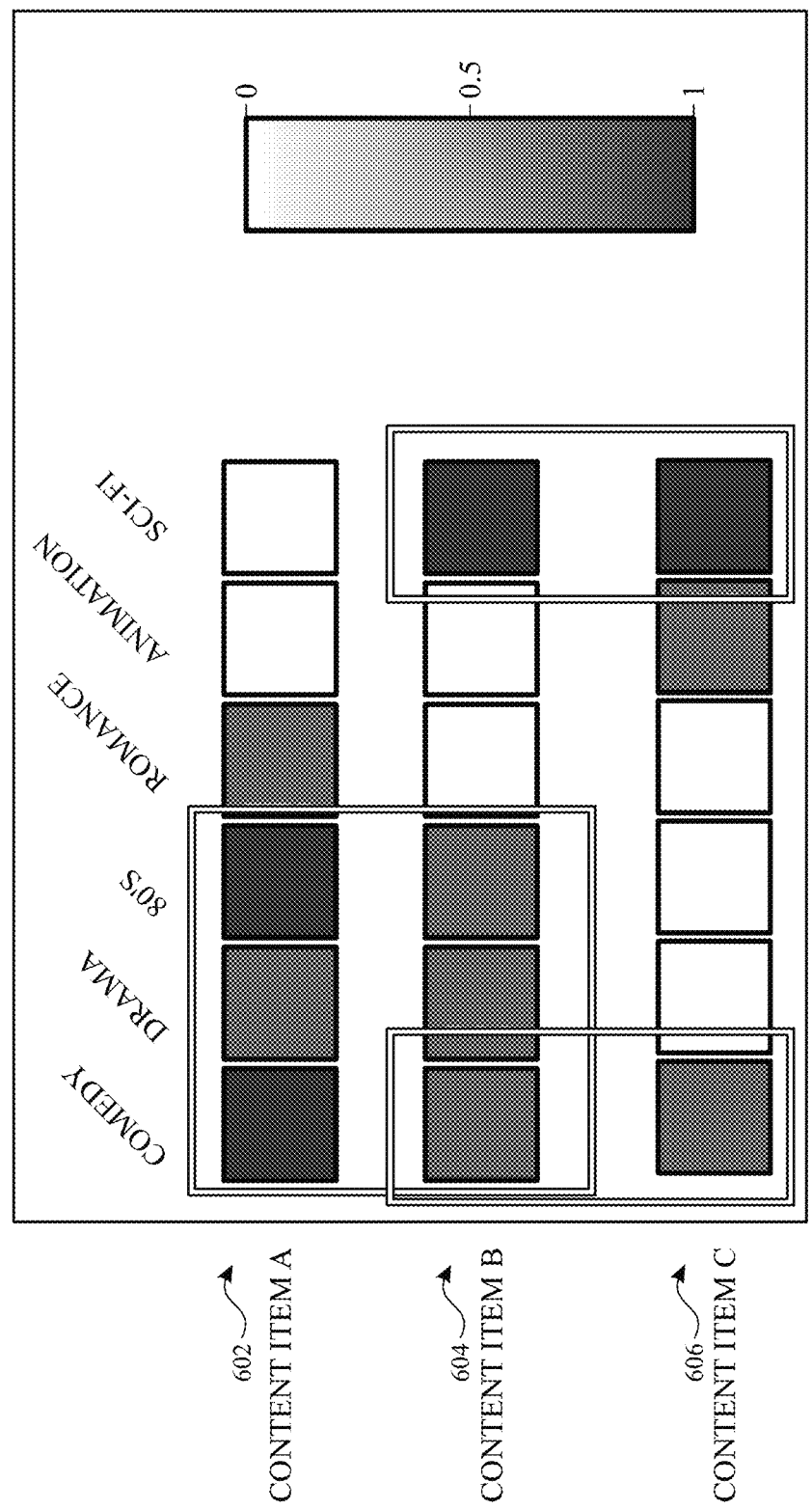
FIG. 6 illustrates a representation of example vector values for content items in accordance with one or more implementations.

FIG. 6 illustrates a representation of example vector values for content items in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

FIG. 6 illustrates example vector values for a content item A 602, a content item B 604, and a content item C 606. As shown in FIG. 6, the content item A may have a high values for the key-value pairs corresponding to the genre attribute values of comedy, 80s, drama and romance. The content item C 606 may have high values for the key-value pairs corresponding to the genre attributes of comedy and sci-fi. The content item B 604 may have high values for the key-value pairs corresponding to the genre attribute values of comedy, sci-fi, and 80s, which overlap with the content item A 602, and may have values for the key-value pairs corresponding to the genre attribute values of comedy and sci-fi which overlap with the content item B 604. Thus, FIG. 6 illustrates that the content item B 604 may be identified, such as in the embedding space, based on the content item A 602 and the content item C 606.

Figure 7:
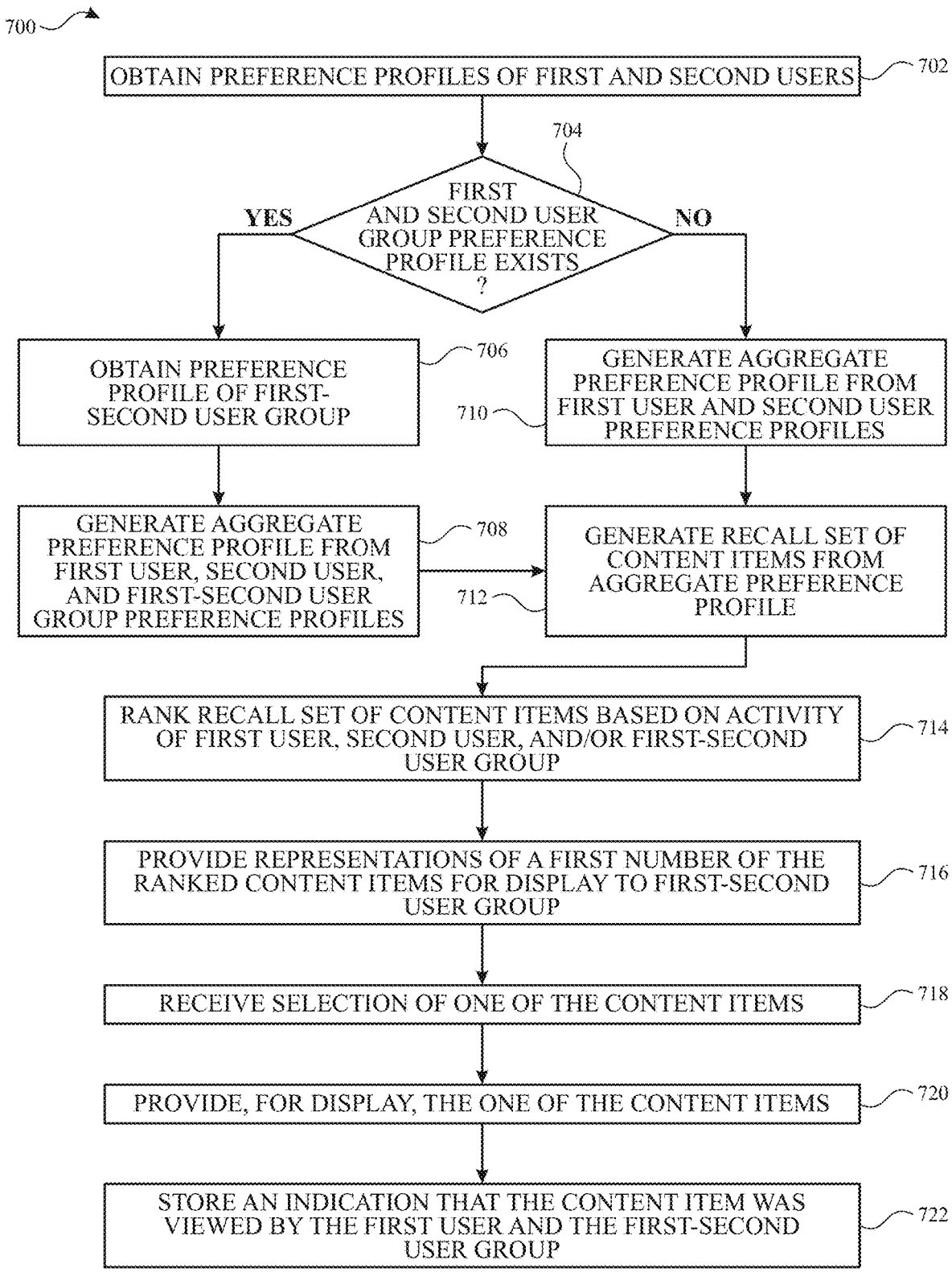
FIG. 7 illustrates a flow diagram of an example process of providing content recommendations for user groups in accordance with one or more implementations.

FIG. 7 illustrates a flow diagram of an example process 700 of providing content recommendations for user groups in accordance with one or more implementations. For explanatory purposes, the process 700 is primarily described herein with reference to the electronic device 102 of FIG. 1. However, the process 700 is not limited to the electronic device 102 of FIG. 1, and one or more blocks (or operations) of the process 700 may be performed by one or more other components of the electronic device 102 and by other suitable devices (e.g., any of the electronic device 103 and/or the server 108). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The example process 700 may be initiated when the electronic device 102 is generating group recommendations for a user group that includes, for example, a first user and a second user (although the user group may include any number of users). For example, the user accounts and/or profiles of the first and second user may be activated and/or active on the electronic device 102. The electronic device 102 obtains preference profiles that correspond to the first and second users (702). The electronic device 102 determines whether a preference profile exists for the first-second user group (704). For example, the electronic device 102 may generate an identifier corresponding to the first-second user group such as by taking a hash of the first and/or second user account identifiers and/or a secret key. The electronic device 102 may then determine whether a preference profile is stored in association with the identifier, e.g., in the memory 204.

If the first-second user group preference profile exists (704), the electronic device obtains the first-second user group preference profile (706) and generates an aggregate preference profile from the first user preference profile, the second user preference profile, and/or the first-second user group profile (708). If the first-second user group preference profile does not exist (704), the electronic device 102 generates the aggregate preference profile from the first and second user preference profiles (710). The electronic device 102 generates a recall set of content items from the aggregate preference profile, such as in the manner described above (712). The electronic device 102 then ranks the content items based on the activity of the first user, the second user, and/or the first-second user group, such as in the manner described above (714).

The electronic device 102 may provide representations of a first number of the ranked content items for display to the user group (716), and may receive a selection of one of the content items, e.g., a selection of one of the representations of the content items (718). The electronic device 102 may then provide, for display to the user group, the selected one of the content items, such as a movie (720), and may attribute the viewing activity for the movie to the first user, the second user and/or the first-second user group. For example, the electronic device 102 may store (722) an indication that the content item was viewed by the first user and the first-second user group.

In one or more implementations, the primary user of the electronic device 102, such as the first user, may need to opt-in for group recommendations before they are activated on the electronic device 102. Similarly, each additional user of the electronic device 102 may need to individually opt-in for the group recommendations before the individual users may be included in a user group. In one or more implementations, the activity history of the user group, the preference profile of a user group, and/or the group recommendations provided to a user group may only be stored on the electronic device 102 (e.g., they may not be propagated to any other devices and/or servers), and the user group preferences, activity, and/or recommendations may be purged after a certain period of time, such a day, a week, a month, a year, or any amount of time.

In one or more implementations, a user account on the electronic device 102 may be indicated as corresponding to a minor. In the instance that a user account indicated as corresponding to a minor is included in a user group, the recommendations for the user group may be filtered to only include content that is appropriate for a minor.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 8:
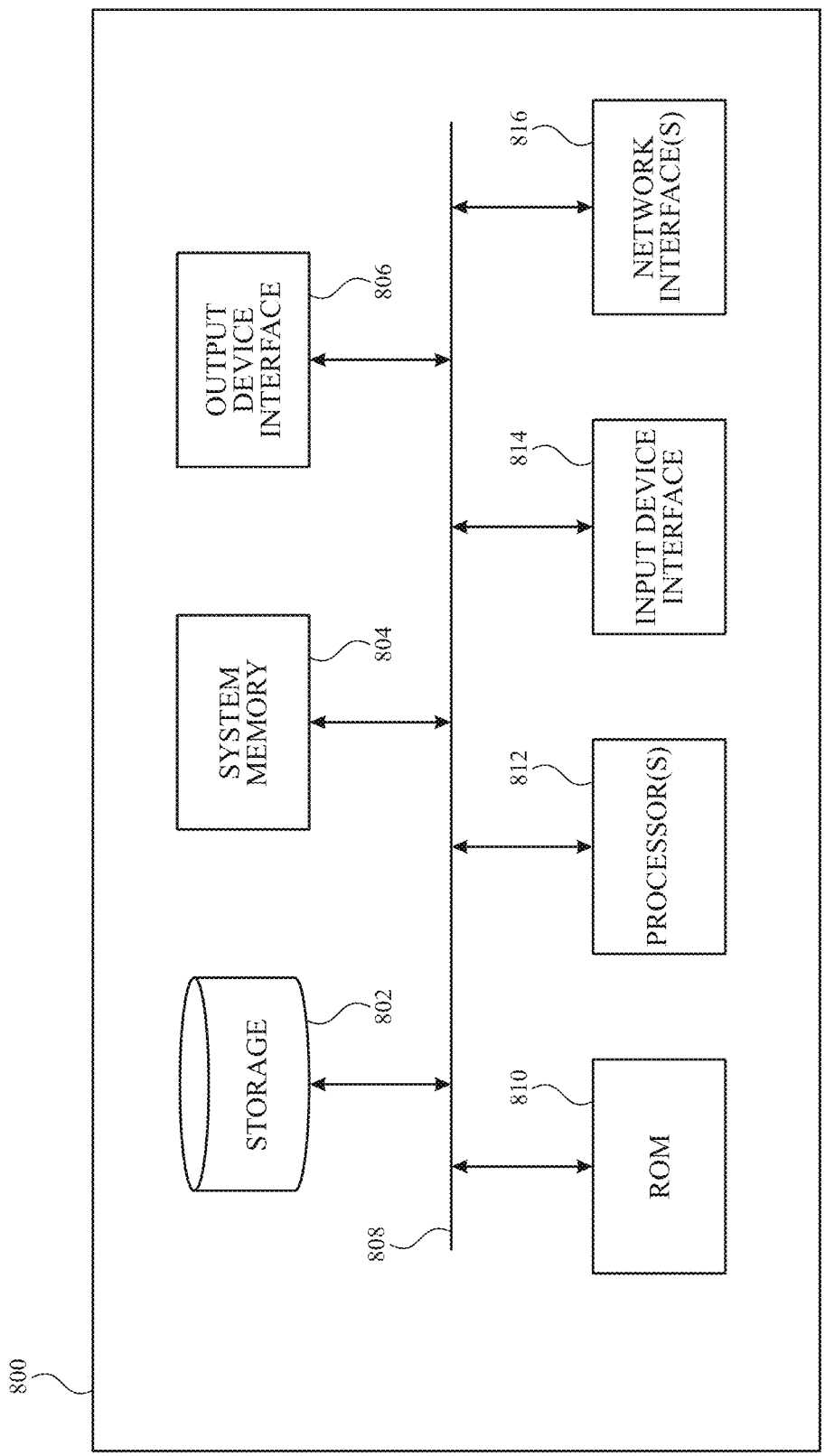
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-103, and/or the server 108 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the server 108 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    obtaining a first preference profile corresponding to a first user and a second preference profile corresponding to a second user;
    obtaining a group preference profile corresponding to a user group that includes the first and second users;
    generating an aggregate preference profile based at least in part on the first preference profile, the second preference profile, and the group preference profile, by:
        generating an intermediate aggregate preference profile based at least in part on an intersection of the first preference profile and the second preference profile, and
        generating the aggregate preference profile based at least in part on a union of the intermediate aggregate preference profile and the group preference profile;
    identifying a plurality of content items based at least in part on the aggregate preference profile;
    ranking the plurality of content items; and
    providing, for display on a content output device, at least one indication of at least one of the ranked plurality of content items as a recommendation for the user group.

2. The method of claim 1, wherein at least one of the first preference profile, the second preference profile, or the group preference profile comprises a vector of key-value pairs.

3. The method of claim 2, wherein each of the key-value pairs corresponds to a possible value of an attribute of the content item.

4. The method of claim 3, wherein the attribute of the content item comprises at least one of a genre or a tag.

5. The method of claim 1, further comprising:
receiving a selection of the indication of the at least one of the plurality of content items;
storing an association between the selection and an identifier corresponding to the user group that includes the first and second users; and
storing another association between the selection and a first user identifier corresponding to the first user.

6. The method of claim 5, further comprising:
generating the identifier corresponding to the user group that includes the first and second users based at least in part on a hash of at least the first user identifier corresponding to the first user and a second user identifier corresponding to the second user.

7. The method of claim 1, wherein identifying the plurality of content items based at least in part on the aggregate preference profile further comprises:
identifying a first candidate content item and a second candidate content item based at least in part on the aggregate preference profile;
identifying a first embedding in an embedding space corresponding to the first candidate content item and a second embedding in the embedding space corresponding to the second candidate content item;
averaging the first and second embeddings to generate an aggregate embedding; and
determining the plurality of content items from a plurality of nearest neighbor embeddings in the embedding space with respect to the aggregate embedding.

8. The method of claim 1, wherein the ranking is based at least in part on an activity history of the first user and a group activity history of the user group that includes the first and second users.

9. The method of claim 8, wherein the group activity history comprises at least one of a content item play, a content item purchase, or a content item impression, and wherein the user group includes a third user.

10. The method of claim 8, wherein a first user account of the first user and a second user account of the second user are both configured on the content output device and the group activity history comprises activity history on the content output device while both the first and second user accounts are selected as active accounts.

11. A non-transitory machine-readable medium comprising instructions that, when executed by one or more processors, cause the one or more processors to perform operations comprising:
obtaining a first preference profile corresponding to a first user and a second preference profile corresponding to a second user;
identifying a first content item based at least in part on the first preference profile and a second content item based at least in part on the second preference profile;
identifying a first embedding corresponding to the first content item in an embedding space and a second embedding corresponding to the second content item in the embedding space, the embedding space comprising a plurality of embeddings corresponding to a plurality of different content items;
generating an aggregate embedding based at least in part on an average of the first and second embeddings;
determining a number of nearest neighbor embeddings in the embedding space with respect to the aggregate embedding;
identifying a plurality of content items that correspond to the nearest neighbor embeddings; and
providing, for display on a content output device, at least one indication of at least one of the plurality of content items as a recommendation to a user group that includes the first and second users.

12. The non-transitory machine-readable medium of claim 11, wherein the first embedding comprises a first vector, the second embedding comprises a second vector, and generating the aggregate embedding based at least in part on the average of the first and second embeddings comprises generating an aggregate vector based at least in part on an average of the first vector and the second vector.

13. The non-transitory machine-readable medium of claim 12, wherein the first vector comprises a first plurality of values that correspond to a plurality of different values of a plurality of different attributes of the first content item.

14. The non-transitory machine-readable medium of claim 13, wherein the plurality of different attributes comprise at least a genre and a tag.

15. The non-transitory machine-readable medium of claim 11, wherein the operations further comprise:
identifying user activity with respect to the at least one indication of the at least one of the plurality of content items; and
storing an indication of the user activity in association with a first user account corresponding to the first user and in association with an identifier corresponding to the user group.

16. The non-transitory machine-readable medium of claim 11, wherein the operations further comprise, for at least one of the nearest neighbor embeddings:
verifying that the at least one of the nearest neighbor embeddings is at least a first threshold distance away from the first and second embeddings in the embedding space.

17. The non-transitory machine-readable medium of claim 16, wherein the operations further comprise, for the at least one of the nearest neighbor embeddings:
verifying that the at least one of the nearest neighbor embeddings is no more than a second threshold distance away from the first and second embeddings in the embedding space.

18. A device comprising:
a memory; and
at least one processor configured to:
obtain a user group preference profile that corresponds to a user group including a first user and a second user;
identify a filter criteria for filtering a plurality of content items;
determine a filter criteria value from the user group preference profile;
search a first activity history of the first user and a second activity history of the second user for candidate content items that satisfy the filter criteria;
obtain, based at least in part on the candidate content items, a plurality of content items that are related to the candidate content items;
filter the plurality of content items based at least in part on the filter criteria value; and
provide, for display to a user, an indication of at least one of the filtered plurality of content items.

19. The device of claim 18, wherein the filter criteria comprises at least one of genre or actor.

* * * * *

UNITED STATES PATENT AND TRADEMARK OFFICE
CERTIFICATE OF CORRECTION

PATENT NO. : 11,962,854 B2  
APPLICATION NO. : 17/493796  
DATED : April 16, 2024  
INVENTOR(S) : Evangelia Christakopoulou et al.

Page 1 of 1

It is certified that error appears in the above-identified patent and that said Letters Patent is hereby corrected as shown below:

In the Claims

Column 16; Line No. 61 (Claim 2): "key- value" should read --key-value--.

Signed and Sealed this  
Ninth Day of July, 2024

Katherine Kelly Vidal  
*Director of the United States Patent and Trademark Office*